(12) United States Patent
Willems et al.

(10) Patent No.: US 6,257,519 B1
(45) Date of Patent: Jul. 10, 2001

(54) THREE-PIECE TAPE REEL ASSEMBLY FOR A DATA STORAGE TAPE CARTRIDGE

(75) Inventors: John D. Willems, Minneapolis; G. Phillip Rambosek, Schafer, both of MN (US); Peter A. Ridl, Dickinson, ND (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 09/408,601

(22) Filed: Sep. 30, 1999

(51) Int. Cl.$^7$ .................................................. B65H 75/14
(52) U.S. Cl. ............................................ 242/608.6
(58) Field of Search ........................ 242/345, 348, 242/608.6, 407.1, 118.6, 118.61, 608.7

(56) References Cited

U.S. PATENT DOCUMENTS

| | | |
|---|---|---|
| 3,857,531 | 12/1974 | Jantzen . |
| 5,027,249 | 6/1991 | Johnson et al. . |
| 5,297,755 | 3/1994 | Felde et al. . |
| 5,400,981 | 3/1995 | Rambosek et al. . |
| 5,513,815 | 5/1996 | Erickson et al. . |
| 5,562,258 | 10/1996 | Sato et al. . |
| 5,564,647 | 10/1996 | Bay et al. . |

FOREIGN PATENT DOCUMENTS

0 588 219 B1    11/1998   (EP) .

*Primary Examiner*—John Q. Nguyen
(74) *Attorney, Agent, or Firm*—Eric D. Levinson (57) ABSTRACT

A tape reel assembly for maintaining a data storage tape. The tape reel assembly includes a first flange, a second flange and a hub ring. The first flange includes a first plate and at least one loop member extending in a generally axial fashion from an inner face of the top plate at a radius R1. The second flange includes a second plate and at least one leg extending in a generally axial fashion from an inner face of the bottom plate. The leg is positioned to selectively engage the loop member. Finally, the hub ring is provided separately and is free of material extending across an inner diameter thereof. The hub ring further defines an outer winding surface and inner surface having a minimum radius R2. The hub ring is assembled between the first plate and the second plate. In this regard, the radius R2 is greater than the radius R1 such that the loop member and the leg extend and interact within an area defined by the inner surface of the hub ring.

30 Claims, 7 Drawing Sheets

THREE-PIECE TAPE REEL ASSEMBLY FOR A DATA STORAGE TAPE CARTRIDGE

BACKGROUND OF THE INVENTION

The present invention relates to a tape reel assembly for data storage tape cartridge. More particularly, it relates to a tape reel assembly comprised of three separately formed components, including a hub ring configured for optimal storage tape engagement.

Data storage tape cartridges have been used for decades in the computer, audio, and video fields. The data storage tape cartridge continues to be an extremely popular form of recording large volumes of information for subsequent retrieval and use.

A data storage tape cartridge generally consists of an outer shell or housing maintaining at least one tape reel assembly and a length of magnetic storage tape. The storage tape is wrapped about a hub portion of the tape reel and is driven through a defined tape path by a driving system. The housing normally includes a separate cover and base, the combination of which forms an opening (or window) at a forward portion thereof for allowing access to the storage tape by a read/write head upon insertion of the data storage tape cartridge into a tape drive. This interaction between storage tape and head may take place within the housing (for example, with a mid-tape load design), or the storage tape may be directed away from the housing to an adjacent area at which the read/write head is located (for example, with a helical drive design or a leader block design). Where the tape cartridge/drive system is designed to direct the storage tape away from the housing, a single tape reel assembly is normally employed. Conversely, where the tape cartridge/drive system is designed to provide head/storage tape interaction within or very near the housing, a two- or dual-tape reel assembly configuration is typically utilized.

Regardless of the number of tape reel assemblies associated with a particular data storage tape cartridge, the tape reel assembly itself is generally comprised of three basic components; namely, an upper flange, a lower flange, and a hub. The hub forms an outer winding surface about which the storage tape is wound. The flanges are disposed at opposite ends of the hub, and are spaced to approximate the height of the storage tape. Notably, the tape reel assembly associated with a single-reel data storage tape cartridge is typically larger in hub and flange diameter, and is more rigidly constructed than the tape reel assembly employed with a dual-reel data storage tape cartridge. In this regard, a typical tape reel assembly for a single-reel data storage tape cartridge integrally molds the lower flange and hub as a single component, as shown, for example, in U.S. Pat. No. 5,400,981 to Rambosek et al. The upper flange is separately provided (i.e. molded) and secured to the hub opposite the lower flange with an adhesive or weld (such as a sonic weld). As part of the molding process for the lower flange/hub, the hub is formed as a ring and a web of material connected to and extending within an inner diameter of the ring. This additional material may include a series of teeth that can be accessed by a tape drive to stop or "brake" tape reel rotation. For example, Rambosek et al. depicts a web of material extending within an inner diameter of the hub ring, at a lower portion thereof. This additional material web renders the hub non-symmetrical. In other words, a lower portion of the hub includes the web of material, whereas the upper portion does not.

While the above-described configuration of a tape reel assembly for a single-reel data storage tape cartridge is essentially universally accepted, certain potential problems have been identified. For example, the lower flange and the hub have differing optimal design characteristics. The outer winding surface on the hub is preferably round, whereas the lower flange is preferably flat. Because these two components are molded as an integral body, it is difficult to achieve a flat flange surface and a truly circular hub. Additionally, the hub and lower flange must be made from the same material. As a result, it may be difficult to provide the hub with appropriate stiffness for specific storage tape conditions and the bottom flange with wear characteristics required for tape drive interface. Finally, during use, the storage tape will impart a circumferential force or stress along the outer winding surface of the hub. Because the hub is non-symmetrical, the stress associated with this tape-induced force is not uniformly distributed along the hub. It is recognized that the stress associated with winding of the storage tape may cause the hub to collapse slightly. With the above-described hub configuration, the hub will not collapse uniformly, but instead will collapse primarily at the upper portion thereof (assuming a cone shape), leading to a varying tape tension across a height of the storage tape. This non-uniform tape tension may cause tape problems, in the form of rippled edges, etc. Notably, the effects of non-uniform hub ring collapse have become more evident with recently available reduced thickness storage tape media. With these highly thin storage tapes, minimization of tape tension has become increasingly important.

Tape reel assemblies associated with dual-reel data storage tape cartridges do not operate under the same conditions as a single reel configuration. As such, the tape reel assemblies associated with a dual-reel data storage tape cartridge have been made available with at least three separate components, including opposing flanges and a hub. An example of such a tape reel design is shown, for example, in U.S. Pat. No. 5,513,815 to Erickson et al. Even with this three-piece design, however, the hub includes a web of material extending across a diameter of the hub ring. This web prevents the hub from evenly distributing stresses placed upon the outer winding surface by the storage tape, possibly leading to the above-described problems.

Data storage tape cartridges are important tools used to maintain vast amounts of information. To remain competitive, data storage tape cartridge manufactures must continually improve cartridge performance while reducing manufacturing costs. To this end, the "standard" tape reel assembly does not provide for requisite uniform stress distribution, thereby leading to potential concerns. Additionally, single reel designs potentially prohibit formation of flat flanges and a round hub. Therefore, a need exists for a tape reel assembly including three separately manufactured components, including a symmetrical hub.

SUMMARY OF THE INVENTION

One aspect of the present invention relates to a tape reel assembly for maintaining a data storage tape. The tape reel assembly includes a first flange, a second flange and a hub ring. The first flange includes a first plate and at least one loop member. The loop member extends in a generally axial fashion from an inner surface of the first plate at a radius R1. The second flange includes a second plate and at least one leg. The leg extends in a generally axial fashion from an inner face of the second plate. In this regard, the leg is positioned to selectively engage the loop member. Finally, the hub ring is separately assembled between the first plate and the second plate. The hub ring is configured to be free of material extending across an inner diameter thereof and defines a first end, a second end, an inner surface and an outer winding surface. In this regard, the inner surface defines a minimum radius R2. The radius R2 is greater than the radius R1 such that upon final assembly, the loop member and the leg extend and engage one another within an area defined by the inner surface. By providing the first flange, the second flange and the hub ring as separate components, each element can be manufactured in accordance with preferred design characteristics. Further, by forming the hub ring to be absent of an internal material web, stresses placed upon the outer winding surface will be evenly distributed across the hub ring. In one preferred embodiment, the loop member is configured to be deflectable relative to the first plate. With this one preferred configuration, a stress placed upon the loop member will not be transferred in large part to the first plate.

Another aspect of the present invention relates to a tape reel assembly for a data storage tape cartridge. The tape reel assembly includes a first flange, a second flange, a hub ring and securing means. The first flange includes a first plate and at least one flexible post. The post extends in a generally axial fashion from an inner face of the first plate, and terminates in a leading end. The second flange includes a second plate and at least one receiving region. The receiving region is formed at an inner face of the second plate and is configured to receive and maintain the leading end of the post. The hub ring is separately assembled between the first plate and the bottom plate. The hub ring is configured to be free of material extending across an inner diameter thereof and defines a first end, a second end, an inner surface and an outer winding surface. The inner surface defines a minimum radius. In this regard, the post is positioned at a radius slightly less than the minimum radius defined by the inner surface of the hub ring such that the post extends within a the hub ring for centering the first flange relative to the second flange. Finally, the securing means is configured to selectively secure the first flange to the second flange, whereby the securing means limits axial displacement of the first flange relative to the second flange upon final assembly. By providing the first flange, the second flange and the hub ring as separate components, each element can be manufactured in accordance with preferred designed characteristics. Further, by forming the hub ring to be absent of an internal material web, stresses placed upon the outer winding surface by a storage tape will be evenly distributed across the hub ring.

Another aspect of the present invention relates to a data storage tape cartridge. The data storage tape cartridge comprises a housing, at least one tape reel assembly and a storage tape. The housing defines an enclosure. The tape reel assembly is disposed within the enclosure and includes a first flange, a second flange and a hub ring. The first flange includes a first plate and at least one loop member. The loop member extends in a generally axial fashion from an inner surface of the first plate at a radius R1. The second flange includes a second plate and at least one leg. The leg extends in a generally axial fashion from an inner face of the second plate and is positioned to selectively engage the loop member upon finally assembly. The hub ring is separately assembled between the first plate and the second plate and is free of material extending across an inner diameter thereof Further, the hub ring defines a first end, a second end, an inner surface and an outer winding surface. In this regard, the inner surface has a minimum radius R2. The radius R2 is greater than the radius R1 such that upon final assembly, the loop member and the leg extend and interact within area defined by the inner surface of the hub ring. Finally, the storage tape is wrapped about the outer winding surface of the hub ring.

Yet another aspect of the present invention relates to a method of manufacturing a tape reel assembly for maintaining a data storage tape. The method includes forming a first flange to include a top plate and a loop member. A second flange is formed to include a bottom plate and a leg. A hub ring is then formed apart from the first and second flanges. In this regard, the hub ring is formed as so to be free of material extending across a an inner diameter thereof Finally, the hub ring is assembled between the top plate and the bottom plate such that the leg is attached to the loop member.

DESCRIPTION OF THE PREFERRED EMBODIMENTS

Figure 1:
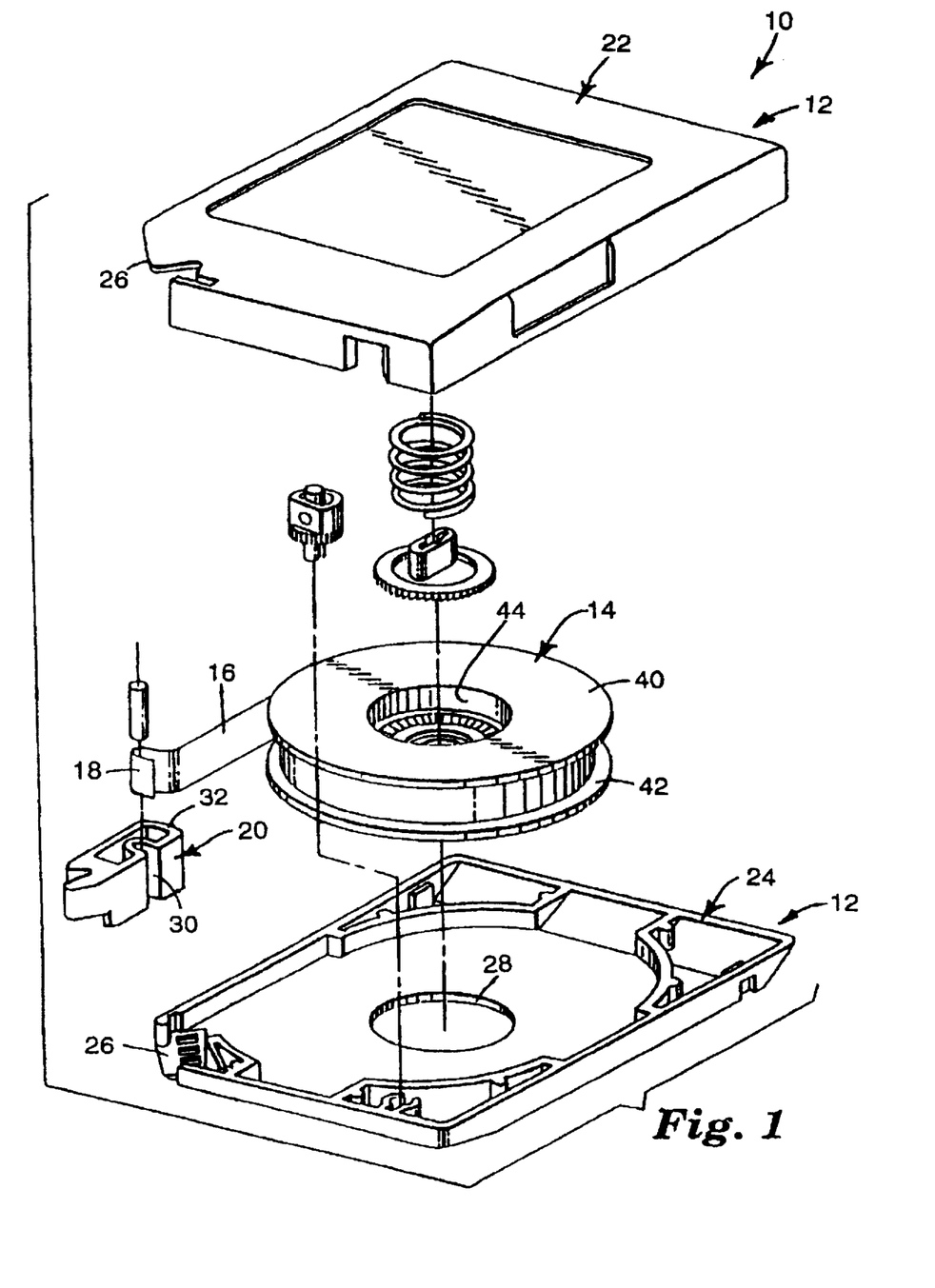
FIG. 1 is an exploded, perspective view of a data storage tape cartridge in accordance to the present invention.

One preferred embodiment of a data storage tape cartridge 10 is shown in FIG. 1. Generally speaking, the data storage tape cartridge 10 includes a housing 12, a tape reel assembly 14, and a storage tape 16. The tape reel assembly 14 is disposed within the housing 12. The storage tape 16, in turn, is wound around the tape reel assembly 14 and includes a free end 18 attached to a leader block 20.

The housing 12 is preferably sized to be received by a typical tape drive (not shown). Thus, the housing 12 may be sized for use within a 5.25 inch (130 mm) form factor drive, a 3.5 inch (90 mm) form factor drive, or other useful sizes. With this in mind, the housing 12 is defined by a first housing section 22 and a second housing section 24. In one preferred embodiment, the first housing section 22 forms a cover, whereas the second housing section 24 serves as a base. It should be understood that directional terminology, such as "cover," "base," "upper," "lower," "top," "bottom," etc. are used for purposes of illustration only, and are in no way limiting.

The first and second housing section 22, 24 are configured to be reciprocally mated to one another and are generally rectangular except for one corner 26 which is angled and forms a leader block window 26. The leader block window 26 is configured to hold the leader block 20 and serves as an opening for the storage tape 16 to exit from the housing 12 such that the storage tape 16 can be threaded through a tape drive (not shown) when the leader block 20 is removed from the leader block window 26. Conversely, when the leader block 20 is snapped into the leader block window 26, the leader block window 26 is covered.

In addition to the leader block window 26, the second housing section 24 further forms a central opening 28. The central opening 28 facilitates access to the tape reel assembly 14 by a drive chuck portion of a tape drive (not shown).

A front surface of the leader block 20 includes a slot 30 for engaging an automatic threading apparatus of a reel-to-reel magnetic tape drive apparatus (not shown) and engages an inclined surface of the corner 26 of the housing 12. A rear surface 32 is rounded to form a portion of an arc of a radius to match the periphery of the take-up hub in the tape drive apparatus as the leader block 20 fits into a slot in the take-up hub. A compliant section may be formed on the leader block 20 to permit the leader block 20 to compress at its rear surface to accommodate especially a first layer of the storage tape 16 when the storage tape 16 is wound onto the tape reel assembly 14.

The storage tape 16 is preferably a magnetic tape of a type commonly known in the art. For example, the storage tape 16 may consist of a balanced polyethylene naphthalate (PEN) based material coated on one side with a layer of magnetic material dispersed within a suitable binder system, and on the other side with a conductive material dispersed in suitable binder system. Acceptable magnetic tape is available, for example, from Imation Corp. of St. Paul, Minn.

Figure 2:
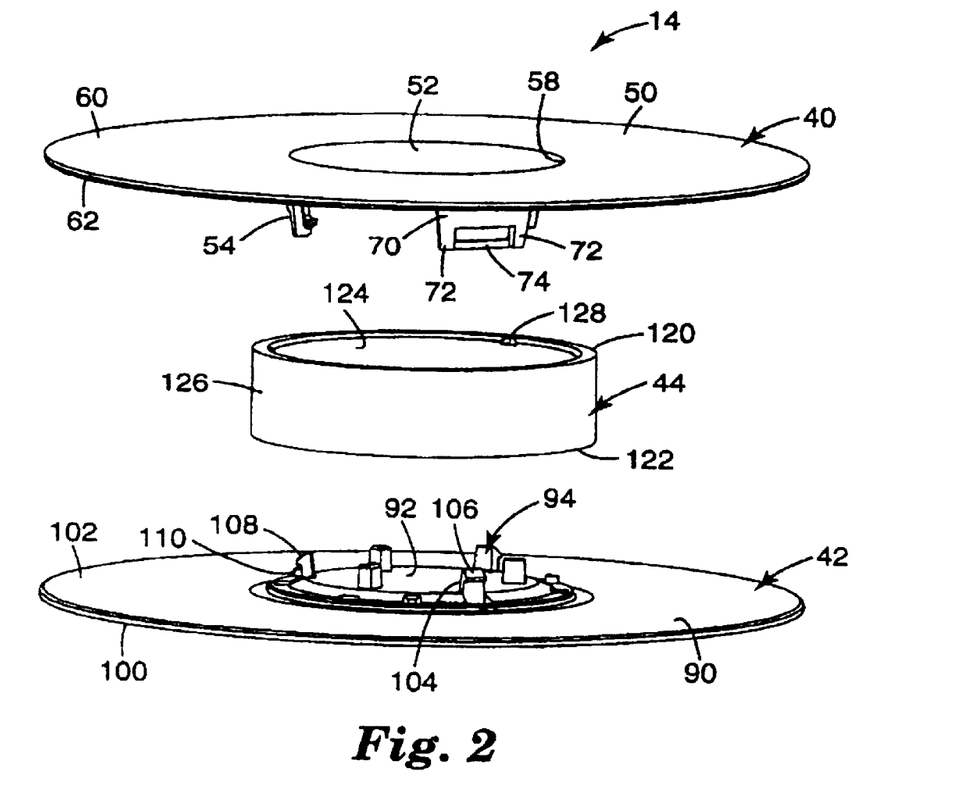
FIG. 2 is an exploded view of a tape reel assembly of the data storage tape cartridge of claim 1.

Finally, as shown in FIG. 2, the tape reel assembly 14 includes an upper flange 40, a lower flange 42 and a hub ring 44. As described in greater detail below, each of the upper flange 40, the lower flange 42 and the hub ring 44 are separately manufactured and subsequently assembled such that the hub ring 44 is secured between the upper flange 40 and the lower flange 42.

Figure 3:
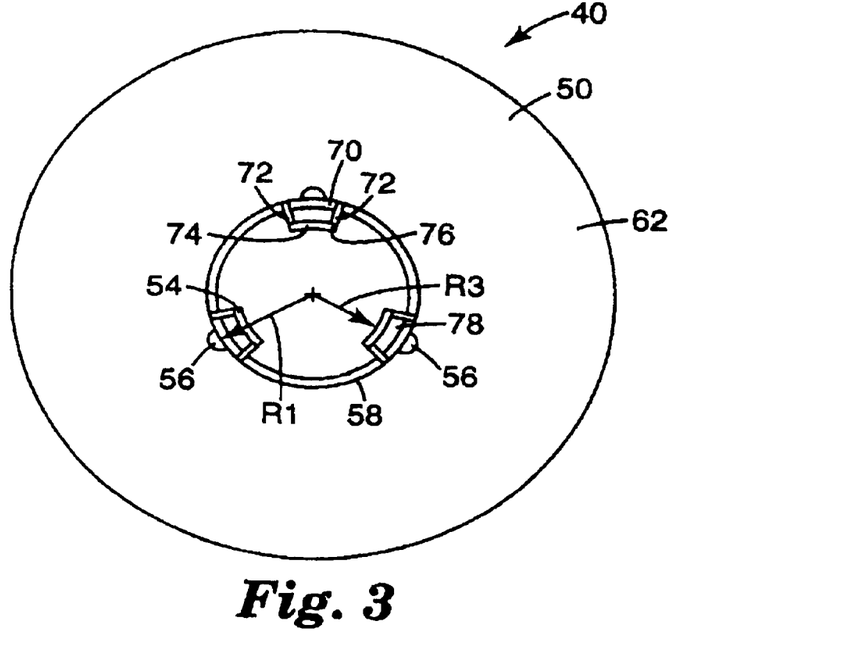
FIG. 3 is a bottom view of an upper flange of the tape reel assembly of FIG. 2.

With reference to FIGS. 2 and 3, the upper flange 40 includes a top plate 50, a rim 52, loop members 54 and anti-rotation bosses 56. In one preferred embodiment, the top plate 50, the rim 52, the loop members 54 and the finger bosses 56 are integrally formed as part of a molding process, with the rim 52, the loop members 54 and the bosses 56 extending from the top plate 50.

The circular top plate 50 is preferably circular and forms a central passage 58. Further, the top plate 50 defines an outer face 60 and an inner face 62 (shown best in FIG. 3). In a preferred embodiment, the top plate 50 is highly flat, having a flatness of less than 0.004 inch warp or axial run-out. Further, the top plate 50 is preferably sized in accordance with a desired data storage tape cartridge 10 (FIG. 1) configuration. Thus, in one preferred embodiment the top plate 50 has a diameter of approximately 97 mm, although other dimensions are equally acceptable.

The rim 52 is formed about the central passage 58, extending in a generally axial fashion from the inner face 62. In one preferred embodiment, the rim 52 is circular in shape to facilitate placement of the hub ring 44 and has an inner diameter of approximately 35 mm and an axial extension of approximately 4 mm. It should be recognized, however, that any other dimensions, either greater or smaller, may be employed.

The loop members 54 extend in a generally axial fashion from the rim 52 (away from the inner face of the top plate 50). In one preferred embodiment, three of the loop members 54 are provided, with the loop members 54 being equidistantly spaced about a circumference defined by the rim 52. Alternatively, a greater or lesser number of the loop members 54 may be provided. Regardless, each of the loop members 54 extend from the rim 52 at a radius R1 (relative to a center of the top plate 50). As will be described in greater detail below, the radius R1 bears a known relationship to a radius defined by the hub ring 44 (FIG. 2) such that each of the loop members 54 can project within an inner area of the hub ring 44 upon finally assembly. Regardless of exact location, each of the loop members 54 are configured to be flexible or deflectable relative to the top plate 50. This preferred characteristic can be achieved via material selection, forming the loop members 54 to be relatively thin, or a combination thereof. By forming the loop members 54 to be flexible or deflectable, a stress placed upon the loop members 54, this stress will not, in large part, be transferred to the top plate 50.

In one preferred embodiment, each of the loop members 54 includes a base portion 70, opposing arms 72 and a cross-member 74. The base portion 70 is arcuate in shape, corresponding with the circle defined by the rim 52. Thus, the base portion 70 is located at the radius R1, having a preferred arc length of approximately 13 mm. The opposing arms 72 extend from the base portion 70 in a generally axial fashion, each having an extension length of approximately 4 mm. In one preferred embodiment, each of the opposing arms 72 are biased or orientated to extend slightly inwardly relative to a central axis of the top plate 50. With the orientation in mind, each of the opposing arms 72 defines an inside surface 76. Finally, the cross-member 74 extends across the opposing arms 72, and is spaced from the base portion 70 so as to define an open engagement area 78. As best shown in FIG. 3, in one preferred embodiment, the cross-member 74 is arcuate in shape, extending between the inside surfaces 76 of the opposing arms 72. Thus, the cross-member 74 defines a radius R3 that is slightly smaller than the radius R1 defined by the base portion 70. Effectively then, the cross-member 74 of each of the loop members 54 is located radially inwardly relative to the rim 52 and thus the central passage 58. The above-described configuration of the loop members 54 preferably renders each of the loop members 54 slightly compliant. Thus, each loop member 54 can deflect slightly to accommodate any tolerance deviations that occur during manufacture, thereby avoiding a transfer of stress to the top plate 50. Notably, while each loop member 54 has been described as including the base portion 70, this feature can be eliminated such that the opposing arms 72 extend directly from the rim 52. Even further, the rim 52 may be omitted, whereby the loop members 54 extend directly from the inner face 62 of the top plate 50.

Finally, the bosses 56 are located along the inner face 62 of the top plate 50. In one preferred embodiment, the upper flange 40 includes three of the bosses 56, with each of the bosses 56 being formed adjacent a respective one of the loop members 54 and thus equidistantly spaced. Alternatively, however, any other number and alternative locations may be employed. Each of the bosses 56 is preferably a semi-circle, extending radially outwardly from the rim 52. As described below, this configuration facilitates engagement of the bosses 56 with a portion of the hub ring 44.

The upper flange 40 is preferably integrally formed as part of a molding process. In one preferred embodiment, the upper flange 40 is molded from a strong, relatively pliable polymer, such as polycarbonate. Alternatively, other rigid yet pliable materials can be employed. The preferred pliable attribute imparts the desired flexibility to the loop members 54. Further, the molding process renders the top plate 50 highly flat.

Figure 4:
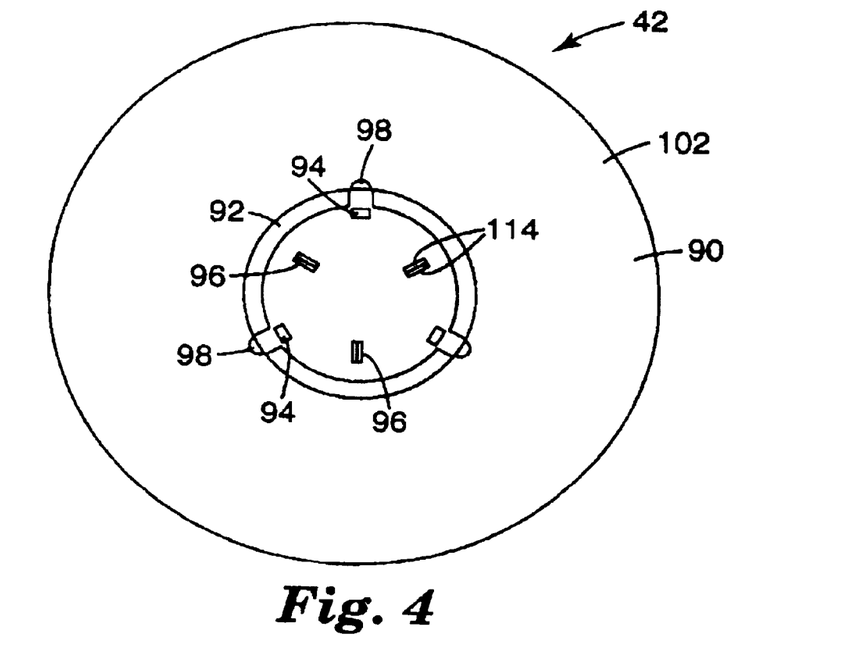
FIG. 4 is a top view of a lower flange of the tape reel assembly of FIG. 2.

With references to FIGS. 2 and 4, the lower flange 42 includes a bottom plate 90, a shoulder 92, legs 94, toothed sections 96 and anti-rotation bosses 98. In a preferred embodiment, the lower flange 42 is integrally formed with the shoulder 92, the legs 94, the toothed sections 96 and the bosses 98 extending from the bottom plate 90.

The bottom plate 90 is preferably circular, corresponding in diameter with the top plate 50 (FIG. 3). Thus, in one preferred embodiment, the bottom plate 90 has a diameter of approximately 97 mm. Similarly, the bottom plate 90 is preferably highly flat, having a flatness of less than 0.004 inch warp or axial run-out. Finally, the bottom plate 90 defines an outer face 100 and an inner face 102.

The shoulder 92 is preferably circular in shape, extending in an axial fashion from the inner face 102 of the bottom plate 90. In one preferred embodiment, an outer circumference of the shoulder 92 serves as a guide surface for assembly of the hub ring 44.

The legs 94 extend in a generally axial fashion from the shoulder 92. As shown in FIG. 4, one preferred embodiment, three of the legs 94 are provided. Alternatively, however, any other number, either greater or smaller, is equally acceptable, so long as the number of the legs 94 corresponds with the number of loop members 54. The legs 94 are positioned relative to a center of the bottom plate 90 so to engage a respective one of the loop members 54 upon final assembly. Thus, the legs 94 are preferably equidistantly spaced, positioned along a circumference of the shoulder 92 at approximately the same radius (R1) as the loop members 54. Further, as best shown in FIG. 2, each of the legs 94 preferably includes a shank 104 and a head 106. The head 106 preferably forms an angled surface 108 and an over-hang 110. The angled surface 108 is configured to facilitate sliding engagement with the respective loop member 54, whereas the over-hang 110 is configured to engage the cross-member 74 in a snap-fitting relationship. In one preferred embodiment, the shank 104 extends from the shoulder 92 in a slightly angular fashion, such that the leg 94 is biased radially outwardly. This outward bias functions in conjunction with the previously described inward bias of the loop members 54 to facilitate a secure fit between the two components upon final assembly.

The toothed sections 96 extend axially from the shoulder 92 and form teeth 114. In one preferred embodiment, three equidistantly spaced toothed sections 96 are provided. Alternatively, any other number, either greater or smaller, may be employed. Regardless, the toothed sections 96 are located at a radius relative to a center of the bottom plate 90 that is less than a radius of the central passage 58 of the top plate 50. With this configuration, upon final assembly, the toothed sections 96, and in particularly the teeth 114, may be accessed through the central passage 58 by a braking mechanism (shown generally in FIG. 1) is known in the art. Notably, sufficient braking can be achieved by forming two or three teeth 114 at each of the toothed sections 96. Alternatively, a greater number of the teeth 114 can be provided.

Finally, the bosses 98 are located along the inner face 102 of the bottom plate 90. In one preferred embodiment, the lower flange 42 includes three of the bosses 98, each being formed adjacent a respective one of the legs 94 and thus equidistantly spaced. Other numbers and/or locations may be utilized. Each of the bosses 98 is preferably a semi-circle, extending radially outwardly from the shoulder 92. As described below, this configuration facilitates engagement of the bosses 98 with a portion of the hub ring 44.

The lower flange 42 is preferably integrally formed during a molding process. In one preferred embodiment, the lower flange 42 is molded from a relatively rigid plastic material selected to provide enhanced wear characteristics. For example, the lower flange 42 can be molded from 20% glass filled polycarbonate, although a wide variety of other relatively rigid materials can alternatively be employed. Further, the molding process renders the bottom plate 90 highly flat. It should be understood that while the lower flange 42 preferably includes the shoulder 92, the shoulder 92 can be eliminated such that the legs 94 and the toothed sections 96 extend directly from the inner face 102 of the bottom plate 90.

With reference to FIG. 2, the hub ring 44 is preferably a cylindrical ring defining a top end 120, a bottom end 122, an inner surface 124 and an outer winding surface 126. The outer winding surface 126 is preferably highly cylindrical or round for optimal engagement with the storage tape 16 (FIG. 1). Further, one preferred embodiment, the hub ring 44 forms upper notches 128 extending in a generally radial fashion from the inner surface 124 at the top end 120. The upper notches 128 are preferably sized and positioned to correspond with the bosses 56 (FIG. 3) formed in the upper flange 40. Similarly, although hidden in FIG. 2, the hub ring 44 preferably forms lower notches extending in a radial fashion from the inner surface 124 at the bottom end 122. These lower notches are preferably configured and positioned to engage the bosses 98 (FIG. 4) associated with the lower flange 42.

Figure 5A:
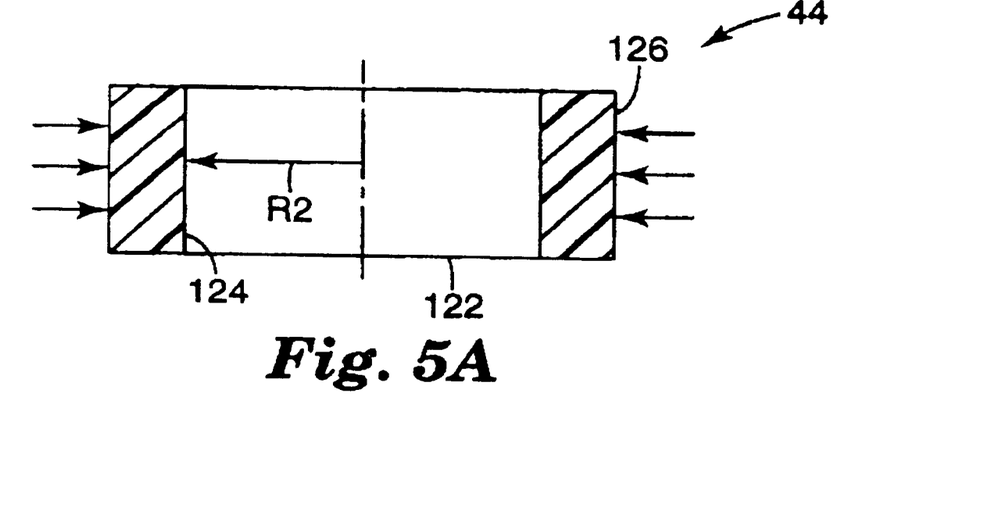
FIG. 5A is a cross-sectional view of a hub ring in accordance with the present invention.

With reference to FIGS. 2 and 5A, the hub ring 44 is preferably configured such that the hub ring 44 is free of material extending across an inner diameter defined by the inner surface 124. That is to say, unlike prior art tape reel assemblies, the hub ring 44 does not include a web of material or similar structure extending across the inner surface 124. Instead, the hub ring 44 is simply a ring-shaped body. To achieve a highly rounded outer surface 126, the hub ring 44 is preferably molded from a plastic material such as 10% glass filled polycarbonate, although a wide variety of other material are equally useful.

Figure 5B:
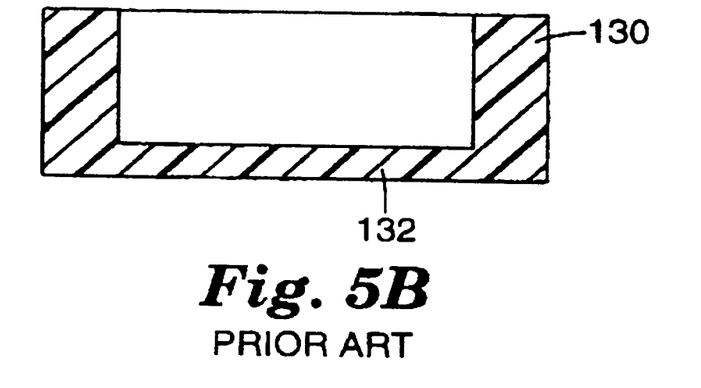
FIG. 5B is a cross-sectional view of a prior art hub.

In addition to being free of material extending across an inner diameter thereof, the hub ring 44 is preferably symmetrical in transverse cross-section, as best shown in FIG. 5A. During use, the storage tape 16 (FIG. 1) is tightly wound about the outer winding surface 126 of the hub ring 44. As a result, the storage tape 16 will exert a force or stress across the hub ring 44 (represented by arrows in FIG. 5A). The symmetrical configuration of the hub ring 44 facilitates a uniform distribution of force across the hub ring 44. Further it may be desirable for the hub ring 44 to collapse slightly in response to this force, such as with environmental temperature changes. To this end, the symmetrical configuration of the hub ring 44 allows the hub ring 44 to preferably collapse uniformly. This desired uniform collapse is in contrast to prior art hub configurations as shown, for example, in FIG. 5B. The prior art hub includes a hub ring 130 and a web of material 132 extending across a lower portion thereof. The web of material 132 essentially reinforces the lower portion of hub ring 130 such that the hub ring 130 will collapse non-uniformly, with a majority of the collapse occurring at an upper portion of the hub ring 130. In contrast, the hub ring 44 (FIG. 5A) of the present invention uniformly distributes stress, and therefore collapses uniformly.

Figure 5C:
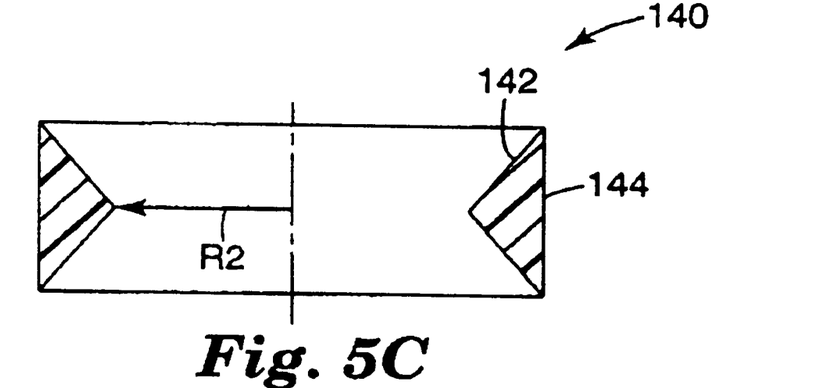
FIG. 5C is a cross-sectional view of an alternative hub ring in accordance with the present invention.

Finally the inner surface 124 of the hub ring 44 is preferably linear in cross-section, defining a radius R2. The radius R2 is configured to allow passage of the loop members 54 (FIG. 2) and the legs 94 (FIG. 2) upon final assembly. As a result, the radius R2 is greater than radius R1 defined by the loop members 54. Thus, an inner area of the hub ring 44 (defined by the inner surface 124) is sufficiently sized for projection of, and interaction between, the loop members 54 and the legs 94, respectively. Alternatively, other symmetrical configurations are acceptable. To this end, an alternative embodiment hub ring 140 is shown in FIG. 5C. The hub ring 140 includes an inner surface 142 and an outer winding surface 144. The inner surface 142 tapers in diameter from the opposing ends of the hub ring 140. Once again, however, the hub ring 140 is symmetrical in transverse cross-section. Therefore, the hub ring 140 uniformly distributes stress or force placed upon the outer winding surface 144. Importantly, regardless of the exact shape of the inner surface 142, the inner surface 142 defines a minimum radius that is sufficiently large for passage of the loop members 54 (FIG. 2) and the legs 94 (FIG. 2) within the hub ring 140.

Returning to FIG. 2, each of the upper flange 40, the lower flange 42 and the hub ring 44 are separately constructed. Thus, the upper flange 40, the lower flange 42, and the hub ring 44 can be molded from different materials specifically selected to accommodate the requirements of a particular tape system. Generally speaking, different tape systems will present different constraints in terms of storage tape tension, head wrap angles, and tape reel assembly modulus of elasticity and allowable creep. The materials selected for the components 40–44 can therefore be varied to satisfy these requirements. For example, the upper flange 40 can be polycarbonate, whereas the lower flange 42 and the hub ring are 20% glass filled polycarbonate or acetal. Alternatively, a wide variety of other acceptable materials may be employed. Even further, the components 40–44 can be formed from the same material. Notably, because the upper flange 40, the lower flange 42 and the hub ring 44 are independently manufactured, the molding process can be selected to achieve optimal characteristics for the respective part. For example, it is desirable that the top plate 50 and the bottom plate 90 be highly flat. Conversely, the outer winding surface 126 of the hub ring 44 is desirably round. By molding the components 40–44 individually, these preferred design parameters can be achieved, unlike prior art tape reel assemblies whereby the hub and at least one of the flanges are integrally formed.

Following molding, the upper flange 40, the lower flange 42 and the hub ring 44 are assembled. For example, the hub ring 44 is coaxially disposed over the shoulder 92 of the lower flange 42 such that the bosses 98 engage the corresponding lower notches (not shown) in the hub ring 44. This engagement limits possible rotation of the hub ring 44 relative to the lower flange 42. Notably, the legs 94 and the toothed sections 96 extend upwardly within an area defined by the inner surface 124 of the hub ring 44. The upper flange 40 is then assembled to the lower flange 42 such that the hub ring 44 is positioned between the top plate 50 and the bottom plate 90. More particularly, the upper flange 40 is directed toward the lower flange 42 such that the loop members 54 pass within the inner surface 124 of the hub ring 44, and engage a respective one of the legs 94. In one preferred embodiment, a snap-fit is achieved between the loop members 54 and the legs 94, respectively. For example, the head 106 associated with one of the legs 94 snaps over and engages the cross-member 74 of a corresponding one of the loop members 54. Notably, because the loop members 54 and the legs 94 are somewhat compliant and biased in opposite directions, any tolerance build-up in the upper flange 40 and/or the lower flange 42 is eliminated. Upon final assembly, the bosses 56 associated with the upper flange 40 engage the upper notches 128 in the hub ring 44, thereby limiting rotation of the hub ring 44 relative to the upper flange 40. It will be understood that following assembly, the tape reel assembly 14 can be orientated in any direction, such that the top plate 50 is below the bottom plate 90.

Figure 6A:
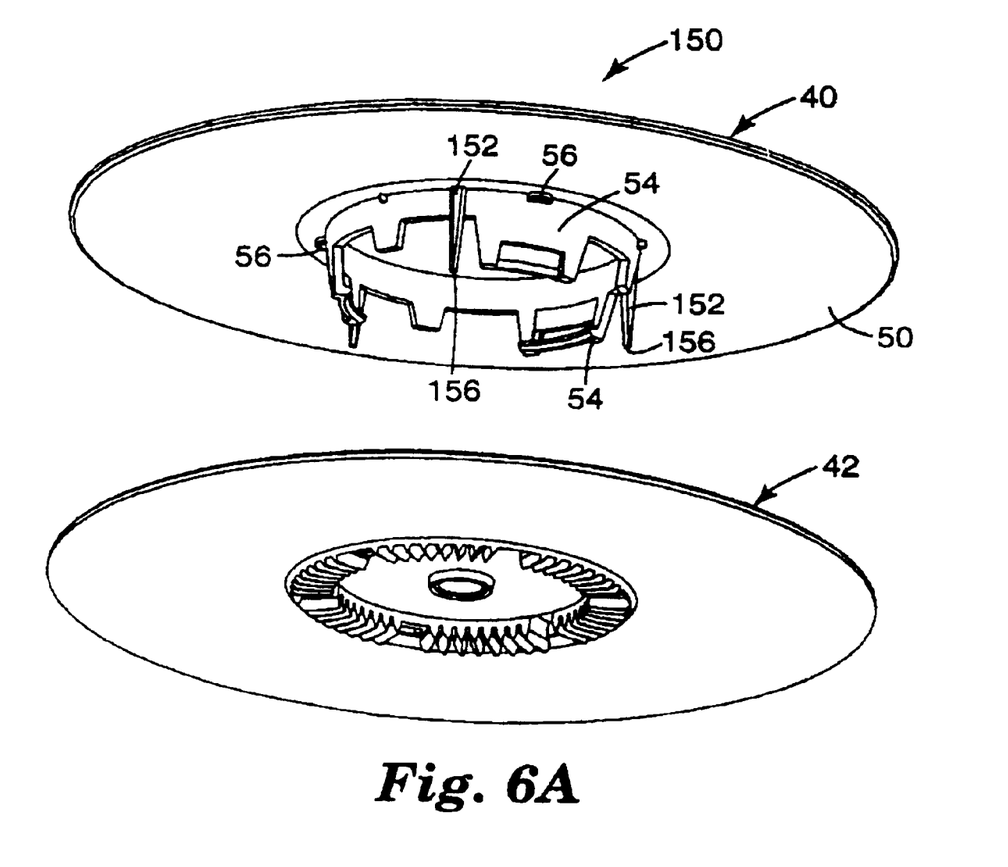
FIGS. 6A and 6B are exploded, perspective views of an alternative tape reel assembly in accordance with the present invention.
Figure 6B:
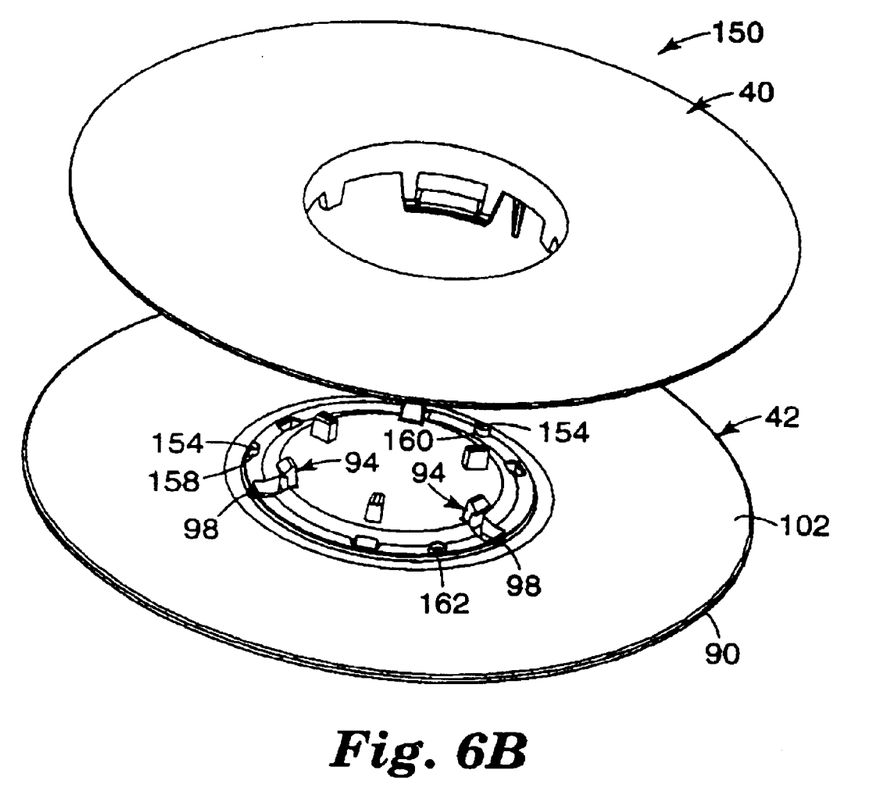

The above-described tape reel assembly 14 relies upon interaction of the upper and lower notches 128 of the hub ring 44 with the bosses 56, 98 associated with the upper and lower flanges 40, 42, respectively, to center the upper flange 40 the lower flange 42, and the hub ring 44. Alternatively, an additional centering assembly can be included to provide a more complete centering of the components 40–44. For example, FIGS. 6A and 6B depict an alternative tape reel assembly 150. As a point of reference, the tape reel assembly 150 is highly similar to the tape reel assembly 14 previously described with like components being similarly numbered. Further, for ease of illustration, the tape reel assembly 150 is shown in FIGS. 6A and 6B without the hub ring 44 (FIG. 2). With this in mind, the tape reel assembly 150 includes the upper flange 40, the lower flange 42 and the hub ring 44 (FIG. 2). The upper flange 40 includes the top plate 50, the loop members 54 and the bosses 56. The loop members 54 and the bosses 56 extend from the inner face 62 of the top plate 50 as previously described. Similarly, the lower flange 42 includes the bottom plate 90, the legs 94 and the bosses 98. As previously described, the legs 94 and the bosses 98 extend from and/or along the inner face 102 of the bottom plate 90.

In addition, the tape reel assembly 150 includes flexible posts 152 and receiving regions 154. The flexible posts 152 are integrally formed as part of the upper flange 40, whereas the receiving regions 154 are integrally formed as part of the lower flange 42.

In a preferred embodiment, and as best shown in FIG. 6A, the flexible posts 152 extend in a generally axial fashion from the inner face 62 of the top plate 50. In one preferred embodiment, three of the posts 152 are provided, with the posts 152 being equidistantly spaced. Alternatively, a greater or lesser number of the posts 152 may be included. Regardless, each of the posts 152 extend from the top plate 50 at a radius (relative to the center of the top plate 50) slightly greater than the radius R1 defined by the loop members 54.

Each of the posts 152 are configured to be flexible or deflectable, terminating at a leading end 156. This desired flexibility can be achieved by an appropriate material or by forming the posts 152 to be relatively thin. For example, in one preferred embodiment, each of the posts 152 is cylindrical, having a diameter or thickness in the range of 0.02–0.04 inch; more preferably 0.03 inch. Further, as previously described, the upper flange 40, and thus the posts 152, are preferably molded from a strong, yet relatively pliable, plastic material, such as polycarbonate. With this preferred configuration, the posts 152 will readily deflect in response to a radial force. For example, in one preferred embodiment, each of the posts 152 can radially deflect at least 0.005 inch.

As best shown in FIG. 6B, the receiving regions 154 are formed along the inner face 102 of the bottom plate 90. For example, in one preferred embodiment, the receiving regions 154 are each defined by a wall 158 extending in a generally axial fashion from the bottom plate 90. In one preferred embodiment, three of the receiving regions 154 are provided. Alternatively, however, any other number, either greater or smaller, is equally acceptable, so long as the number of the receiving regions 154 corresponds with the number of posts 152. The receiving regions 154 are positioned relative to a center of the bottom plate 90 so as to engage a respective one of the posts 152 upon final assembly. Thus, the receiving regions 154 are preferably equidistantly spaced, positioned at approximately the same radius as the posts 152.

In a preferred embodiment, the wall 158 associated with each of the receiving regions 154 is arcuate or semi-circular in shape. Further, the wall 158 defines an inner face 160 and an outer face 162. As shown in FIG. 6B, the outer face 162 tapers radially outwardly at an upper portion of the wall 158. This tapered configuration facilitates the wall 158 guiding the leading end 156 of the respective post 152 into the receiving region 154 during assembly. Finally, the receiving regions 154 are each sized to be slightly larger than a width of the post 152. With this configuration, the posts 152 are maintained within the receiving regions 154, respectively by an interference fit.

Figure 6C:
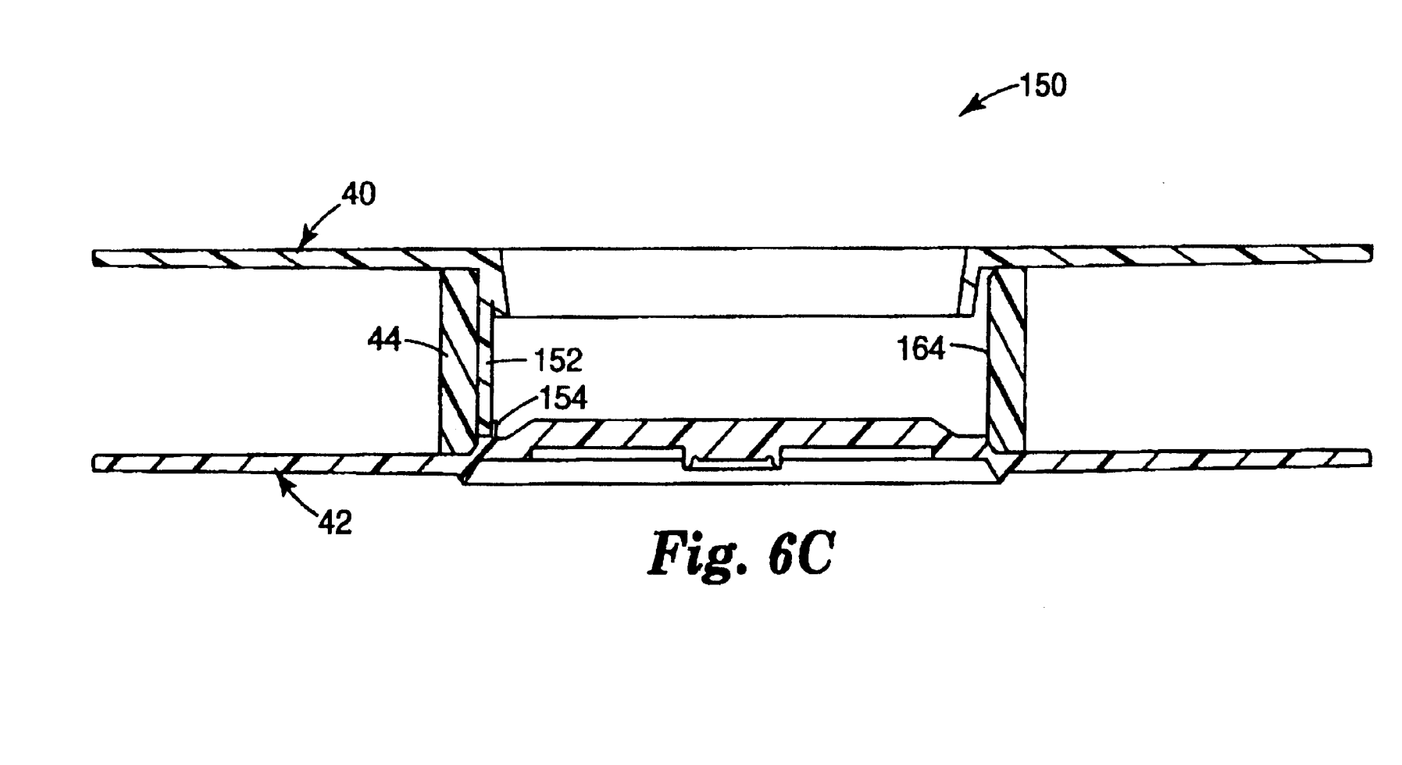
FIG. 6C is a cross-sectional view of the tape reel assembly of FIGS. 6A and 6B.

Assembly of the tape reel assembly 150 is best described with reference to FIG. 6C. As a point of reference, the cross sectional view depicted in FIG. 6C does not include the loop members 54 (FIG. 2) or the legs 94 (FIG. 2), it being understood that these components interact with one another as previously described. Effectively, the loop members 54 and the legs 94 limit axial displacement of the top flange 40 and the bottom flange 42. In addition, the post 152 and the receiving regions 154 serve to center the top flange 40, the bottom flange 42, and the hub ring, 44 relative to one another. As shown in FIG. 6C, the outer surface 162 of the wall 158 guides the leading end 156 of the post 152 into the receiving region 154. Due to the flexible nature of the posts 152, the posts 152 will easily bend or deflect as the leading end 156 is guided by the outer surface 162 of the wall 158. For example, the outer surface 162 preferably directs the respective post 152 radially outwardly in turn causing each of the posts 152 to deflect radially outwardly.

In one preferred embodiment, the posts 152 are configured to interact with the inner surface 124 of the hub ring 44. Because three, equidistantly spaced posts 152 are preferably provided, this interaction positively centers the hub ring 44 relative to the flanges 40, 42. To this end, in one preferred embodiment, the inner surface 124 of the hub ring 144 is configured to taper radially inwardly from a central portion 164 thereof. Thus, each of the posts 152 contact, and therefore position, the hub ring 44 along the central portion 164, thereby significantly reducing deflection of the outer surface 126 of the hub ring 44. Notably, the interaction between the posts 152 and the hub ring 44 occurs as the posts 152 are deflected radially outwardly upon engagement with the respective walls 158, as previously described. In other words, the hub ring 44 does not impede initial engagement between the post 152 and the receiving regions 154; instead the posts 152 contact the hub ring 44 only after being deflected radially outwardly via the receiving regions 154. Further, because leading ends 156 are not tightly secured within the receiving regions 154, respectively, desired deflection of the posts 152 will easily occur and be dictated by the hub ring 44.

The above-described posts 152/receiving regions 154 can be altered significantly, yet still provide a positive centering of the flanges 40, 42 and the hub ring 44. For example, the hub ring 44 may be configured to include slots to receive the posts 152. Even further, the posts 152 may be replaced with a centering means including crush ribs that collapse or "lock" to the hub ring 44.

The tape reel assembly of the present invention provides a marked improvement over previous designs. Unlike prior art tape reel assemblies associated with single-reel data storage tape cartridges, the tape reel assembly of the present invention independently manufactures and assembles the upper flange, the lower flange and the hub ring. As a result, each component can be molded in accordance with preferred design considerations. Further, the hub ring is symmetrical in transverse cross-section, thereby facilitating uniform winding surface force distribution. Finally, the tape reel assembly can be provided with a centering device for positively centering the individual components relative to one another.

Although the present invention has been described with reference to preferred embodiments, workers skilled in the art will recognize that changes can be made at form and detail without departing from the spirit of scope of the present invention. For example, the tape reel assembly of the present invention has been described with reference to a single-reel data storage tape cartridge. Alternatively, the disclosed assembly design can be incorporated into a dual-reel data storage tape cartridge. Similarly, the upper flange and the lower flange associated with the tape reel assembly can be configured to achieve selective engagement by means other than a loop member/snap leg. For example, the upper flange can be adhered to the lower flange with an adhesive or similar device.

What is claimed is:

1. A tape reel assembly for maintaining a data storage tape, the tape reel assembly comprising:
    a first flange including a first plate and at least one loop member extending in a generally axial fashion from an inner face of the first plate at a radius R1;
    a second flange including a second plate and at least one leg extending in a generally axial fashion from an inner face of the second plate, the at least one leg being positioned to selectively engage the at least one loop member; and
    a hub ring separately assembled between the first plate and the second plate, the hub ring being free of material extending across an inner diameter thereof and defining a first end, a second end, an inner surface, and an outer winding surface for maintaining a storage tape, the inner surface having a minimum radius R2;
    wherein R2 is greater than R1 such that upon final assembly, the at least one loop member and the at least one leg extend within an area defined by the inner surface of the hub ring.

2. The tape reel assembly of claim 1, wherein the first flange includes three loop members each extending from the inner face of the first plate at the radius R1, and further wherein the second flange includes three legs extending from the inner face of the second plate, the three legs being positioned to selectively engage a respective one of the three loop members.

3. The tape reel assembly of claim 1, wherein the at least one loop member is configured to be deflectable relative to the first plate such that a stress placed upon the at least one loop member is not transferred to the first plate.

4. The tape reel assembly of claim 1, wherein the at least one loop member includes:
    a base portion connected to the inner face of the first plate at the radius R1;
    a pair of spaced arms extending from the base portion, each of the arms defining an inner surface and an outer surface; and
    a cross-member extending across the arms opposite the base portion, the cross-member configured to engage a portion of the at least one leg and projecting radially inwardly relative to the inner surfaces of the arms such that the cross-member defines a radius R3, wherein R3 is less than R1.

5. The tape reel assembly of claim 1, wherein the hub ring forms a notch extending radially outwardly from the inner surface at the first end, and further wherein the first flange includes a boss extending radially along the inner face of the first plate, the boss being positioned to engage the notch upon final assembly so as to limit rotation of the hub ring relative to the first flange.

6. The tape reel assembly of claim 1, wherein the hub ring is configured to be substantially symmetrical in transverse cross-section.

7. The tape reel assembly of claim 1, wherein the hub ring is configured to uniformly distribute a force placed upon the outer winding surface.

8. The tape reel assembly of claim 1, further comprising: centering means for centering the first flange and the second flange upon assembly.

9. The tape reel assembly of claim 8, wherein the centering means includes:
at least one flexible post extending in a generally axial fashion from the inner face of the first plate at a radius slightly less than the radius R2, the at least one post terminating in a leading end; and
at least one receiving region formed at the inner face of the second plate, the at least one receiving region configured to receive and maintain the leading end of the at least one post;
wherein upon final assembly, engagement of the at least one post by the at least one receiving region aligns the first flange and the second flange.

10. The tape reel assembly of claim 9, wherein the at least one receiving region is defined by a wall extending axially from the inner face of the second plate, the wall defining an inner face and an outer face, the outer face tapering radially outwardly at an upper portion thereof for guiding the leading end of the at least one post into the at least one receiving region.

11. A tape reel assembly for maintaining a data storage tape, the tape reel assembly comprising:
a first flange including a first plate and at least one flexible post extending in a generally axial fashion from an inner face of the first plate, the at least one post terminating in a leading end;
a second flange including a second plate and at least one receiving region formed at an inner face of the second plate, the at least one receiving region being configured to receive and maintain the leading end of the at least one post;
a hub ring separately assembled between the first plate and the second plate, the hub ring being free of material extending across an inner diameter thereof and defining a first end, a second end, an inner surface and an outer winding surface for maintaining a storage tape, the inner surface having a minimum radius; and
securing means for selectively securing the first flange to the second flange, whereby the securing means limits axial displacement of the first flange relative to the second flange upon final assembly;
wherein the at least one post is positioned at a radius slightly less than the minimum radius defined by the hub ring such that the at least one post extends within an area defined by the inner surface of the hub ring, and further wherein engagement of the at least one post by the at least one receiving region centers the first and second flanges.

12. The tape reel assembly of claim 11, wherein the first flange includes three flexible posts each extending from the inner face of the first plate at a radius slightly less than the minimum radius defined by the hub ring, and further wherein the second flange includes three receiving regions formed at the inner face of the second plate, the three receiving regions being positioned to selectively engage a respective one of the three posts.

13. The tape reel assembly of claim 11, wherein the at least one receiving region is defined by a wall extending axially from the inner face of the second plate.

14. The tape reel assembly of claim 13, wherein the wall is arcuate.

15. The tape reel assembly of claim 13, wherein the wall defines an inner face and an outer face, the outer face tapering radially outwardly at an upper portion thereof for guiding the leading end of the at least one post into the at least one receiving region.

16. The tape reel assembly of claim 15, wherein the outer face of the wall is configured to deflect the at least one post radially outwardly during assembly.

17. The tape reel assembly of claim 11, wherein the at least one post is configured such that upon final assembly, at least a portion of an outer surface of the at least one post contacts the inner surface of the hub ring.

18. The tape reel assembly of claim 17, wherein a portion of the inner surface of the hub ring tapers radially inwardly for engaging the at least one post.

19. The tape reel assembly of claim 11, wherein the securing means includes at least one loop member extending from the first plate and a corresponding leg extending from the second plate, the at least one loop being configured to engage the leg upon final assembly.

20. A data storage tape cartridge comprising:
a housing defining an enclosure;
at least one tape reel assembly disposed within the housing, the tape reel assembly including:
a first flange including a first plate and at least one loop member extending in a generally axial fashion from an inner face of the first plate at a radius R1,
a second flange including a second plate and at least one leg extending in a generally axial fashion from an inner face of the second plate, the at least one leg being positioned to selectively engage the at least one loop member,
a hub ring separately assembled between the first plate and the second plate, the hub ring being free of material extending across an inner diameter thereof and defining a first end, a second end, an inner surface, and an outer winding surface, the inner surface having a minimum radius R2,
wherein R2 is greater that R1 such that upon final assembly, the at least one loop member and the at least one leg extend within an area defined by the inner surface of the hub ring; and
a storage tape wound about the outer winding surface of the hub ring.

21. The data storage tape cartridge of claim 20, wherein the first flange includes three loop members each extending from the inner face of the first plate at the radius R1, and further wherein the second flange includes three legs extending from the inner face of the second plate, the three legs being positioned to selectively engage a respective one of the three loop members.

22. The data storage tape cartridge of claim 20, wherein the at least one loop member is configured to be deflectable relative to the first plate such that a stress placed upon the at least one loop member is not transferred to the first plate.

23. The data storage tape cartridge of claim 20, wherein the at least one loop member includes:
   a base portion connected to the inner face of the first plate at the radius R1;
   a pair of spaced arms extending from the base portion, each of the arms defining an inner surface and an outer surface; and
   a cross-member extending across the arms opposite the base portion, the cross-member configured to engage a portion of the at least one leg and projecting radially inwardly relative to the inner surfaces of the arms such that the cross-member defines a radius R3, wherein R3 is less than R1.

24. The data storage tape cartridge of claim 20, wherein the hub ring forms a notch extending radially outwardly from the inner surface at the first end, and further wherein the first flange includes a boss extending radially along the inner face of the first plate, the boss being positioned to engage the notch upon final assembly so as to limit rotation of the hub ring relative to the first flange.

25. The data storage tape cartridge of claim 20, wherein the hub ring is configured to be substantially symmetrical in transverse cross-section.

26. The data storage tape cartridge of claim 20, wherein the hub ring is configured to uniformly distribute a force placed upon the outer winding surface.

27. The data storage tape cartridge of claim 20, further comprising:
   centering means for centering the first flange and the second flange upon final assembly.

28. The data storage tape cartridge of claim 27, wherein the centering means includes:
   at least one flexible post extending in a generally axial fashion from the inner face of the first plate at a radius slightly less than the radius R2, the at least one post terminating in a leading end; and
   at least one receiving region formed at the inner face of the second plate, the at least one receiving region configured to receive and maintain the leading end of the at least one post;
   wherein upon final assembly, engagement of the at least one post within the at least one receiving region aligns the first flange and the second flange.

29. The data storage tape cartridge of claim 28, wherein the at least one receiving region is defined by a wall extending axially from the inner face of the second plate, the wall defining an inner face and an outer face, the outer face of the wall tapering radially outwardly at an upper portion thereof for guiding the leading end of the post into the at least one receiving region.

30. A method of manufacturing a tape reel assembly for maintaining a data storage tape, the method including:
   forming a first flange to include a top plate and a loop member;
   forming a second flange to include a bottom plate and a leg;
   forming a hub ring apart from the first and second flanges, the hub ring being free of material extending across an inner diameter thereof; and
   assembling the hub ring between the top plate and the bottom plate such that the leg is attached to the loop member.

* * * * *